US005701515A

United States Patent [19]

Gradeler

[11] Patent Number: 5,701,515
[45] Date of Patent: Dec. 23, 1997

[54] INTERFACE FOR SWITCHING PLURALITY OF PIN CONTACTS TO TRANSMIT DATA LINE AND PLURALITY OF PIN CONTACTS TO RECEIVE DATA LINE TO INTERFACE WITH SERIAL CONTROLLER

[75] Inventor: Eric J. Gradeler, Los Altos Hills, Calif.

[73] Assignee: Apple Computer, Inc., Cupertino, Calif.

[21] Appl. No.: 260,716

[22] Filed: Jun. 16, 1994

[51] Int. Cl.[6] .................................................... G06F 3/00
[52] U.S. Cl. ........................ 395/834; 395/884; 395/889; 395/892
[58] Field of Search ............................. 379/58, 59, 88, 379/357; 395/828, 830, 834, 882, 280; 439/166, 55, 946; 361/737; 455/331; 364/231.1

[56] References Cited

U.S. PATENT DOCUMENTS

| | | | |
|---|---|---|---|
| D. 362,250 | 9/1995 | Harding et al. | D14/138 |
| 574,766 | 12/1897 | Long et al. | 395/275 |
| 4,490,775 | 12/1984 | Quan | 361/406 |
| 4,509,113 | 4/1985 | Heath | 395/886 |
| 4,578,537 | 3/1986 | Faggin et al. | 179/2 |
| 4,628,480 | 12/1986 | Floyd | 364/400 |
| 4,872,470 | 10/1989 | Farago | 135/97 |
| 4,884,269 | 11/1989 | Duncanson et al. | 370/110.1 |
| 4,924,520 | 5/1990 | Kolbert | 380/59 |
| 5,121,482 | 6/1992 | Patton | 395/275 |
| 5,127,041 | 6/1992 | O'Sullivan | 379/59 |
| 5,274,771 | 12/1993 | Hamilton et al. | 395/275 |
| 5,305,317 | 4/1994 | Szczepanek | 370/85.5 |
| 5,408,618 | 4/1995 | Aho et al. | 395/325 |
| 5,420,987 | 5/1995 | Reid et al. | 395/325 |
| 5,422,656 | 6/1995 | Allard et al. | 345/173 |
| 5,423,697 | 6/1995 | MacGregor | 439/638 |
| 5,428,748 | 6/1995 | Davidson et al. | 395/275 |
| 5,440,449 | 8/1995 | Scheer | 361/686 |
| 5,440,770 | 8/1995 | Davis et al. | 379/99 |
| 5,444,768 | 8/1995 | Lemaire et al. | 379/68 |
| 5,446,768 | 8/1995 | Griffin et al. | 375/377 |
| 5,457,601 | 10/1995 | Georgopulos et al. | 361/686 |
| 5,465,401 | 11/1995 | Thompson | 455/89 |
| 5,537,607 | 7/1996 | Ploger, III | 395/830 |
| 5,548,782 | 8/1996 | Michael et al. | 395/835 |

*Primary Examiner*—Christopher B. Shin
*Assistant Examiner*—Anderson I. Chen
*Attorney, Agent, or Firm*—Paul D. Carmichael

[57] ABSTRACT

An analog interface for a PC module and an electronic device which communicate through a standard 68-pin PC card digital interface. The PC module includes a cellular phone radio and an analog modem that provides cellular communication capabilities to both a notebook computer and a telephone handset that includes a PC card slot. The PC module and the notebook computer have modified the standard 68-pin PC card interface, while remaining compliant with the standard interface, to enable voice applications in the notebook computer. The PC card interface is modified by reassigning pin assignments on the 68-pin connector through the use of a switch and audio lines in both the notebook computer and in the PC module. When the PC module is docked in the notebook computer, the switch in the notebook computer reassigns a set of pins on the 68-pin connector to the audio lines in the notebook, and the switch in the PC module reassigns the same set of pins to the audio lines in the PC module to allow voice applications on the notebook computer. When the PC module is docked in the telephone handset, the switch in the PC module reassigns a set of pins on the 68-pin connector to the audio lines in the PC module to allow cellular voice communications via the handset.

3 Claims, 12 Drawing Sheets

INTERFACE FOR SWITCHING PLURALITY OF PIN CONTACTS TO TRANSMIT DATA LINE AND PLURALITY OF PIN CONTACTS TO RECEIVE DATA LINE TO INTERFACE WITH SERIAL CONTROLLER

CROSS-REFERENCE TO RELATED PATENT APPLICATION

The present application is related to application Ser. No. 08/260,733, entitled "A PC Card Cellular-Based Communication System" which was filed on the same date as the present application and assigned to the assignee of the present application.

BACKGROUND OF THE INVENTION

The present invention relates generally to a PC card cellular-based system, and more particularly to a PC card cellular-based communication system combining a PC module containing wireless telephone electronics that provides mobile telecommunications for a portable computer, and a telephone handset sleeve that may be associated with the PC module to form a handheld wireless telephone.

Notebook and portable computers are small, lightweight versions of conventional desktop personal computers (PCs). The portability aspect of notebook computers emphasizes the need for notebooks to have greater storage capacity and access to external data. Because of mechanical size limitations placed on hardware devices, however, not all of the storage and communication components found in desktop PCs can be included in notebook computers. Instead, the missing hardware is provided on PC cards which interface with the notebook computers. A PC card is a small credit-card sized device that may be inserted or removed from a Slot in a computer in a manner similar to a floppy disk.

The standard for PC cards is defined by the Personal Computer Memory Card International Association (PCMCIA). The PCMCIA standard is a hardware and software specification for memory, input-output (I/O), storage, and communications devices such as a memory cards, hard disk drives, and modems. The PCMCIA specification defines three physical card and slot sizes referred to as Type I, Type II and Type III. All three types of PC cards are approximately two inches wide and three inches in length, but the height varies to accommodate various functions. A Type I PC card is approximately three millimeters in height and typically includes memory type devices, such as random access memory (RAM). A Type II PC card typically includes either memory or I/O devices, such as a modem, and is approximately five millimeters in height. A Type III PC card includes memory and I/O devices similar to a Type II PC card but the components are larger. For example, a Type III PC card may contain a hard disk drive. At approximately ten millimeters in height, a Type PC III card is the tallest of the three.

A PC card containing the components of analog modem is widely used to enable a notebook computer to communicate with external sources. A PC analog modem card typically includes a phone jack for connection to a wall-mounted telephone jack, referred to as a RJ11 socket, through a standard telephone cable. Once connected, a PC analog modem card allows the notebook to transmit and receive data over telephones lines. The problem with this method of communication is that the portability of the notebook computer is limited to the availability of wall-mounted RJ11 sockets. For example, a notebook equipped with a PC analog modem card is unable to communicate to the outside world in environments that do not include wall-mounted RJ11 sockets, such as outdoors and in most forms of transportation.

The recent emergence of wireless communication devices has eliminated the need for wire-based communications by making it possible for portable computers to communicate using radio waves. Cellular-based telephones and modems include a cellular radio and antenna, and operate by transmitting radio signals to a central service provider. The service provider then transfers the signal via the public switched telephone network to a remote telephone or modem. The use of cellular technology is advantageous because it frees notebook computers from wire-based communication, thereby increasing the portability and connectivity of the notebook.

Figure 1:
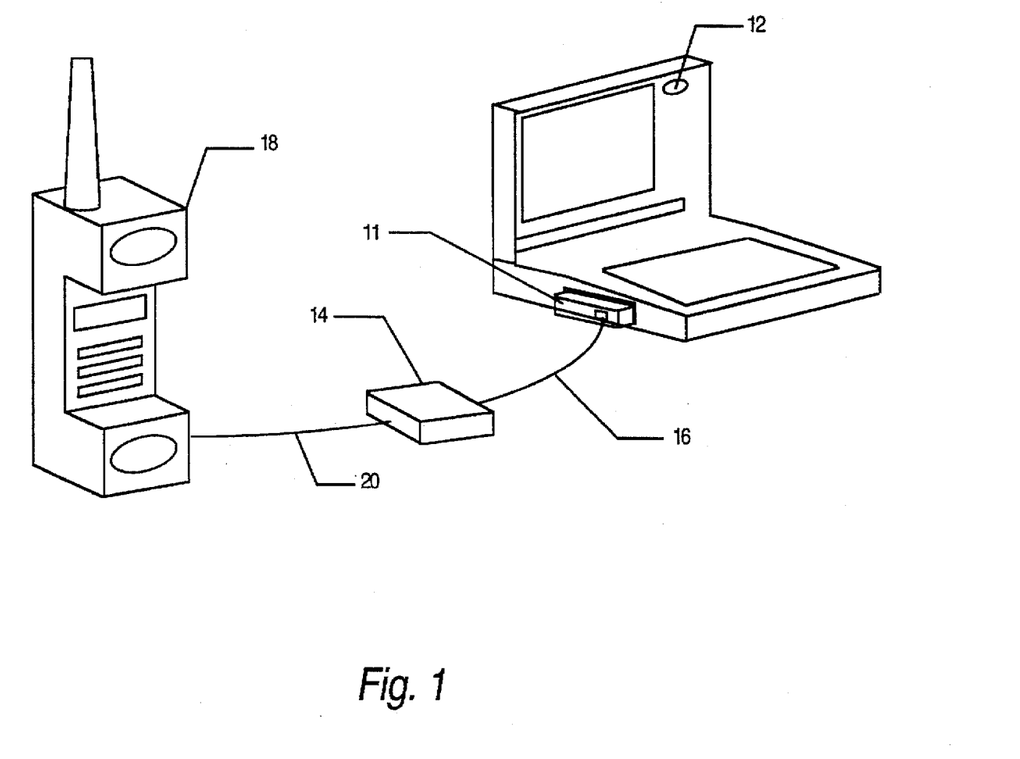
FIGS. 1 and 2 depict prior art systems for enabling a notebook computer to communicate over a cellular telephone.

Various forms of cellular technology exist that provide notebook computers with cellular capability. One such method is shown in FIG. 1. This method involves connecting a PC analog modem card 11 of a notebook computer 12 to a portable cellular phone 18. The connection is made through a converter box 14 which is a device that acts as an interface between the protocol of the analog modem card 11 and the protocol of the cellular phone 18. The converter box 14 is connected to the PC analog modem card 11 via a standard telephone cord 16, and to the handheld cellular phone 18 over a proprietary connection 20. Connecting a PC analog modem card 11 to a cellular phone in this manner eliminates the need for the notebook computer 12 to transmit and receive data through its PC analog modem card 10 using a wall-mounted RJ11 socket (not shown).

Figure 2:
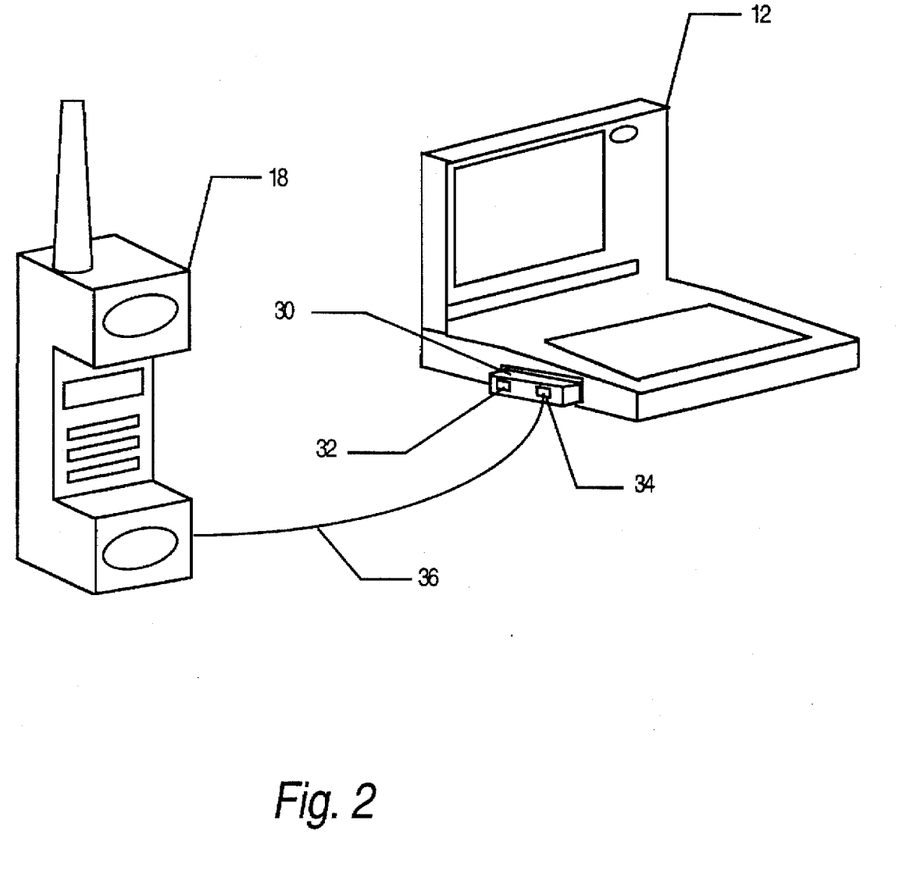

A second method for providing cellular capability to a notebook is to provide a cellular-ready modem on a PC card which is then inserted into the notebook computer 12, as shown in FIG. 2. A cellular-ready modem card 30 includes an analog modem that is capable of communicating with a cellular phone without the need for a converter box 14 (FIG. 1). The cellular-ready modem card 30 includes a standard telephone jack 32 and a jack 34 for direct connection to a cellular phone 18 via cable 36. The two jacks allow the modem card 30 to be connected to a standard RJ11 socket for standard analog transmission, or to a cellular phone 18 for cellular transmission. A PC cellular-ready modem card 30 dispenses with the need for the converter box 14 (FIG. 1) by moving the functions of the converter box into the PC card. 30. However, as in the first method, a cellular-ready modem card 30 requires that the notebook computer 12 to be tethered by a cable to a cellular phone 18.

The two methods described above require at least one tethered connection between the notebook and a second device (a converter box or cellular phone). Therefore, these methods do not provide an integrated wireless communication design for notebook computers. The tethered connection between a notebook and a cellular phone is usually over a proprietary interface which prevents a user from using devices made by different manufacturers because of incompatibility between the devices. Furthermore, because components are tied together, tethered-based solutions increase the possibility that one, or all, of the components may be toppled from a table-top and damaged.

Figure 3:
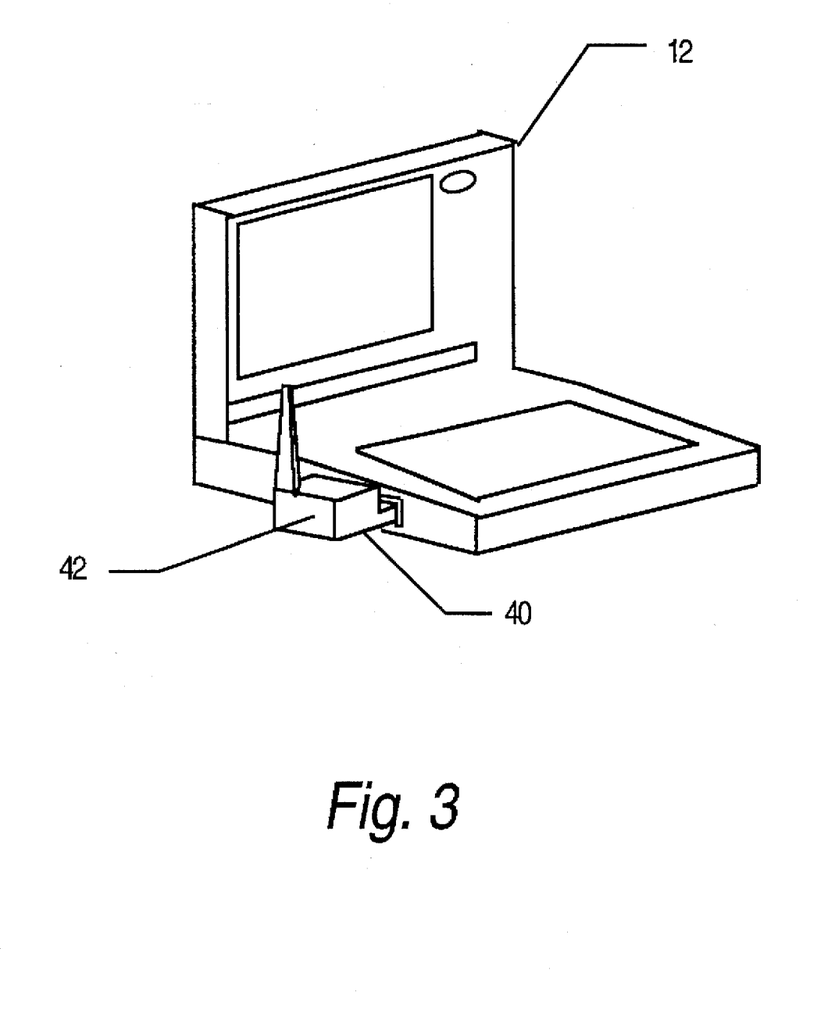
FIG. 3 shows a notebook computer equipped with a prior art PCMCIA cellular modem card.

To overcome these problems, a PCMCIA Type II card has been introduced that includes a cellular modem rather than an analog modem. This allows the notebook computer to transmit data over a cellular radio without requiring a tether or a portable cellular telephone. However, as shown in FIG. 3, a PCMCIA cellular modem card 40 includes a large extension 42 that houses a cellular radio and antenna. The design of the cellular modem card 40 may include circuitry which does not fit in a standard-sized PC card because the extension 42 of the cellular modem card 40 extends beyond both the sides and the top of the notebook computer 12. Because the design of the cellular modem card 40 is not integrated with the design of notebook computer 12, the extension 42 of the cellular modem card 40 may interfere with the user of the notebook computer 12 when performing keyboard operations. Furthermore, the cellular modem card 40 is fragile and may be cracked or broken since the weight of the extension 42 is unsupported outside the housing of the notebook 12.

Besides the design disadvantages of a cellular modem card, the card also possess functional limitations. The user of a notebook computer equipped with cellular modem card incurs the cost of a cellular radio, but not the functionality of a portable cellular telephone because cellular modems enable the cellular transmission of raw data and facsimile data (fax) but not the transmission of voice. The user must therefore purchase a cellular telephone in addition to a cellular modem card if the user also desires to place regular cellular telephone calls. Although the prices of cellular phones are declining, cellular subscription rates remain high. In addition, cellular carriers only issue one cellular telephone number per subscription. This means a user who purchases a cellular phone to supplement the card must maintain two subscription accounts and two phone numbers, one for the PC cellular modem and one for the cellular telephone.

Accordingly, it is an object of the present invention to provide a PC card cellular-based communication system that supports both computer and telephone cellular usage using a single cellular subscription and telephone number.

It is another object of the present invention to provide a PC card cellular-based communication system that includes a PC module containing a cellular radio and an analog modem that provides cellular capability to both a notebook computer and a telephone handset sleeve.

It is a further object of the present invention to provide a PC module that supports voice applications, is integrated into the design of a notebook computer, and operates without the use of a tether.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

SUMMARY OF THE INVENTION

The present invention includes a PC card for providing wireless communication to an electronic device having a microphone and speaker. The PC card communicates with the electronic device through a standard PC interface. The PC card comprises a radio and antenna, and means coupled to the radio for exchanging bi-directional analog signals with the electronic device through the standard PC interface to thereby provide voice capability to the electronic device through the microphone and speaker of the electronic device.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

The present invention will be described in terms of the preferred embodiment. The present invention is PC card cellular-based system including a PC module containing a cellular phone radio and an analog modem that provides cellular communication capabilities to both a notebook computer and a telephone handset.

Figure 4:
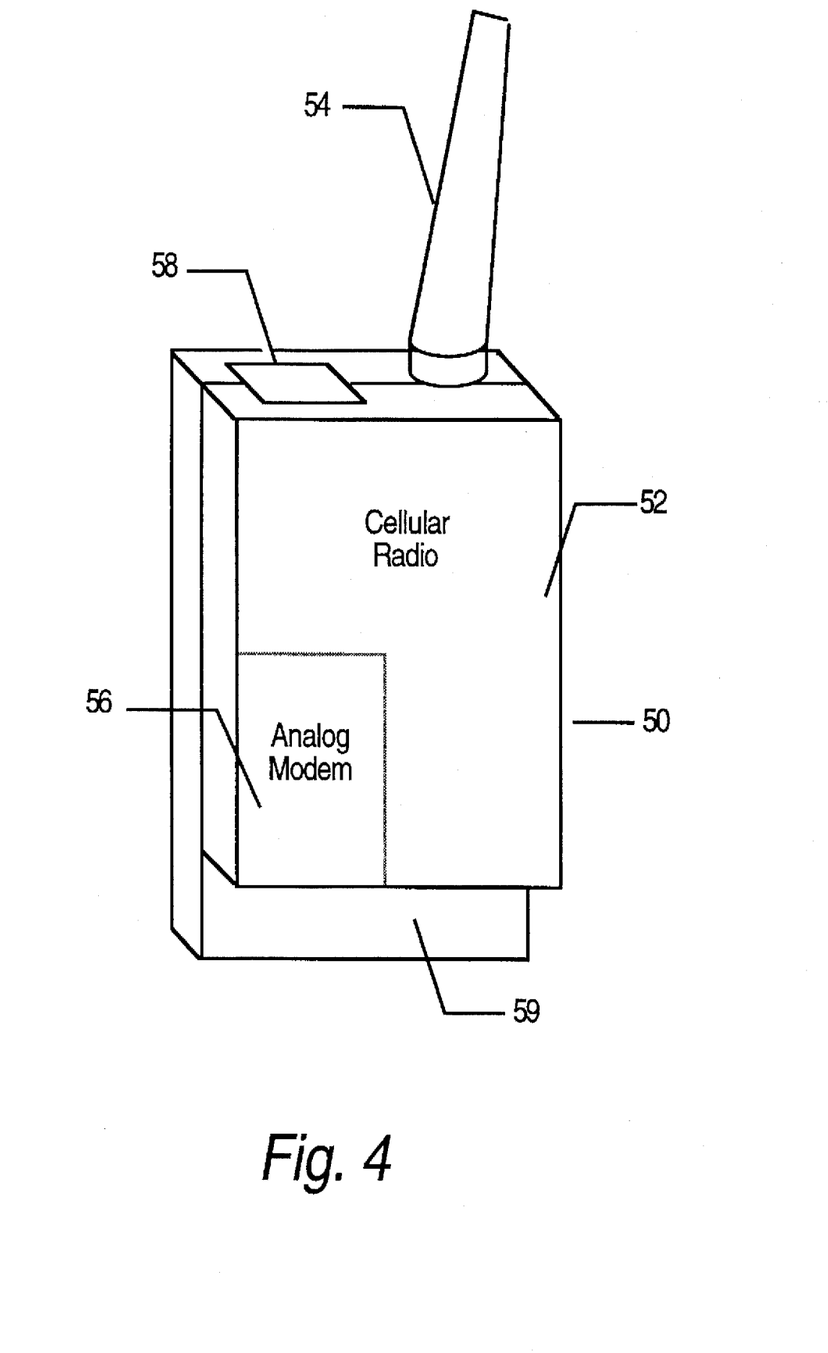
FIG. 4 depicts a PC module in accordance with the present invention.

Referring to FIG. 4, a PC module 50 in accordance with the present invention is shown. The PC module 50 comprises a cellular radio 52, an antenna 54, an analog modem 56, a connector 58 for external connections, and a standard female 68-pin connector 59. In a preferred embodiment, the PC module 50 is a PCMCIA Type III card and may be inserted into any electronic device that is equipped with either a PCMCIA Type III slot or a PCMCIA bay comprising two Type II slots. The PCMCIA standards currently define a 68-pin connector as the electrical hardware interface for PC cards. When the PC module 50 is docked into a PC slot, the female 68-pin connector 59 on the PC module 50 mates with a male connector of the PC slot (not shown).

The analog modem 56 operates in a well known manner and the signals produced by the analog modem 56 are broadcast over the antenna 54 by the cellular radio 52. Because of size constraints involved in placing both the cellular radio 52 and the analog modem 56 together in a Type III card, the size of the analog modem 56 must be reduced in order to fit into the card. In a preferred embodiment, the size of the analog modem 56 is miniaturized based on the express modem architecture disclosed in U.S. Pat. No. 5,134,648, issued on Jul. 25, 1992, and assigned to the assignee of the present application, entitled "Reconfigurable Modem for a Computer or the Like", the entire disclosure of Which is hereby incorporated by reference. In a preferred embodiment, the cellular radio 52 is compliant with the Advanced Mobile Phone System (AMPS) standard which defines protocols for cellular communications, and the analog modem 56 is compliant with the former Consultative Committee for International Telephone and Telegraph (CCITT) V.32 and V.17 bis standard, now the International Telecommunications Union (ITU) standard.

Figure 5:
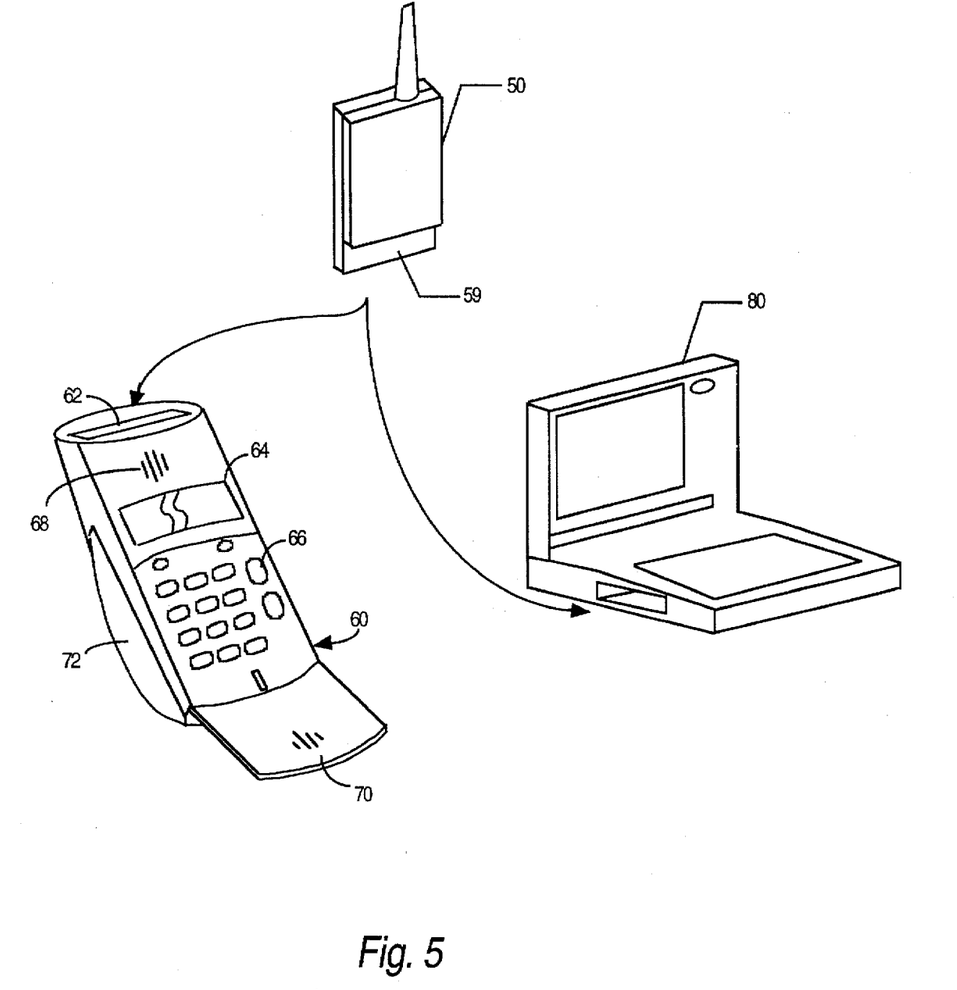
FIG. 5 is an illustration showing that the PC module may be used with both a telephone handset and a notebook computer.
Figure 6:
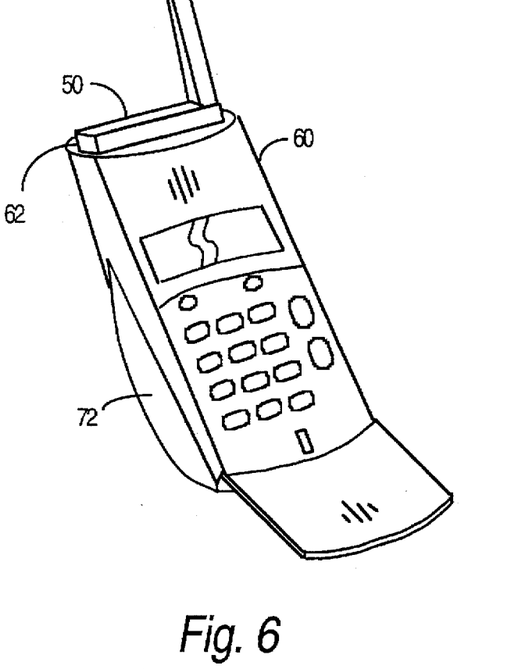
FIG. 6 depicts the PC module inserted into a PC slot of the handset to provide a hand-held cellular telephone.

A primary feature of the present invention is that the PC module 50 provides cellular capabilities to both a notebook computer 80 and a wireless telephone handset sleeve 60 that includes a Type III PC slot 62 for accepting the PC module 50, as shown in FIG. 5. The telephone handset 60 also includes a display 64, a keyboard 66, a speaker 68, a microphone 70, and a battery housed in battery compartment 72. When the 68-pin connector 59 of PC module 50 is inserted into the slot 62 of the handset 60, as shown in FIG. 6, the handset 60 becomes a handheld cellular telephone powered by the battery contained in the handset 60. Cellular telephone calls may then be made from the handset 60 in a conventional manner. In a preferred embodiment of the present invention, the PC module 50 includes an address book of names and associated telephone numbers. This feature allows one PC module 50 to be utilized with more than one handset 60 while retaining the telephone numbers of the user.

Figure 7:
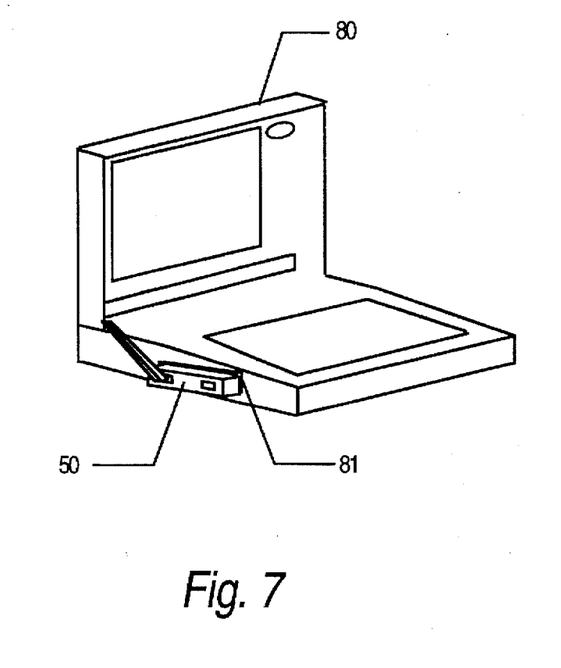
FIG. 7 depicts the PC module inserted into a PC slot of the notebook computer to provide cellular voice and data capability to the notebook computer.

FIG. 7 Shows the PC module 50 inserted into a PC slot 81 of the notebook computer 80. Once inserted into the slot 81 of the notebook computer 80, the PC module 50 is powered by the computer power supply (not shown). The PC module 50 provides cellular voice capability to the notebook computer 80 through the cellular radio 52, and provides fax and data capabilities to the notebook computer 80 through the analog modem 56. The voice capability provided by the PC module 50 enables the use of voice applications on the notebook computer 80, such as speakerphone and voice messaging applications. It should be noted, however, that the PC module 50 does not implement the speakerphone function within the notebook computer 80. Rather, the PC module 50 only allows for the speakerphone function if the notebook contains the proper architecture, as explained below. By using the PC module 50 in both the handset 60 and notebook 80, a user benefits from both a cellular telephone and a cellular notebook that share the same telephone number under a single cellular service provider subscription.

Figure 8:
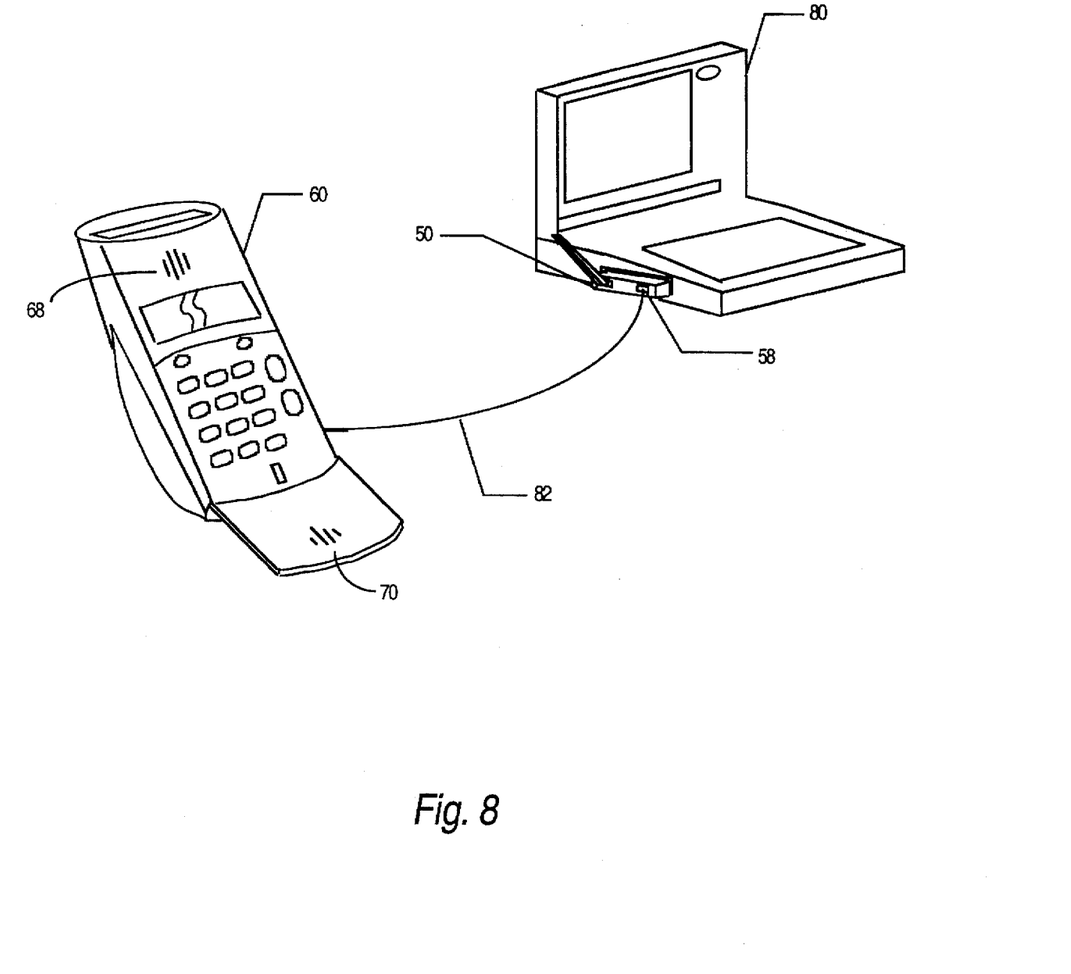
FIG. 8 depicts the PC module in the notebook computer and connected to the handset to provide voice telephone calls from the handset.

Even though the PC module 50 enables a user to place voice calls from the notebook computer 80 when the PC module 50 is docked in to the slot 81 of the notebook computer, a user may prefer to use the handset 60 rather than the computer to place voice calls either because of privacy concerns, or because the speakerphone function is not available. For these reasons, the present invention supports a privacy handset feature, as shown in FIG. 8, wherein the handset 60 is connected to an audio cable 82 which plugs into the connector 58 of the PC module 50. Through the use of the audio cable 82, a user may hold telephone conversations using the microphone 68 and speaker 70 of the handset 60 while the PC module 50 remains docked in the notebook computer 80, rather than using the speaker and microphone of the notebook computer.

Figure 9:
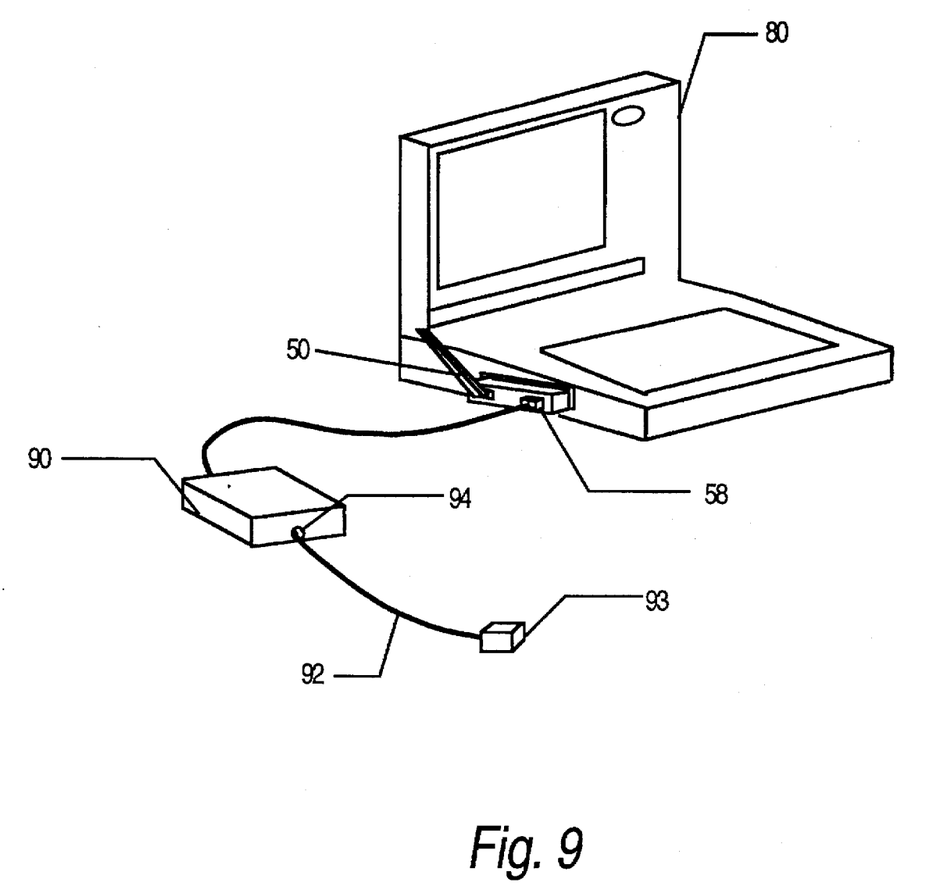
FIG. 9 depicts the PC module in the notebook computer connected to an external data access arrangement for direct connection to telephone lines for landline modem usage.

Because transmission over telephone lines is more reliable and less expensive than cellular transmission, the PC module 50 may also be used as a standard analog modem when a regular phone line is available. As shown in FIG. 9, the analog modem mode of operation requires the use of an external data access arrangement (DAA) 90. A DAA 90 is a standard physical telephone line interface that allows other devices to interface with a telephone line. The DAA 90 is plugged into the connector 58 of the PC module 50 and includes a standard RJ11 socket 94 for connection to a standard wall-mounted RJ11 socket (not shown) via a standard phone cable 92 and telephone plug 93. In this mode, the cellular radio 52 of FIG. 4 is disabled and all communication occurs through the analog modem 56 of the PC module 50.

The voice capability provided by the PC module 50, mentioned above, is implemented over the 68-pin interface between the PC module 50 and the PC slot of an electronic device, such as the notebook computer 80. For voice applications, such as speakerphone and voice messaging, the PC module 50 and the notebook computer 80 must exchange bidirectional analog audio signals over this 68-pin interface. Currently, PC card interface standards are digital and cannot process analog signals. Therefore, to provide the PC module 50 with voice capability, the present invention transforms a portion of the PC card digital interface into an analog audio interface while remaining compliant with PC card standards, currently PCMCIA release 2.1 (See Chapter 4.2.6 (Customization)).

Figure 10:
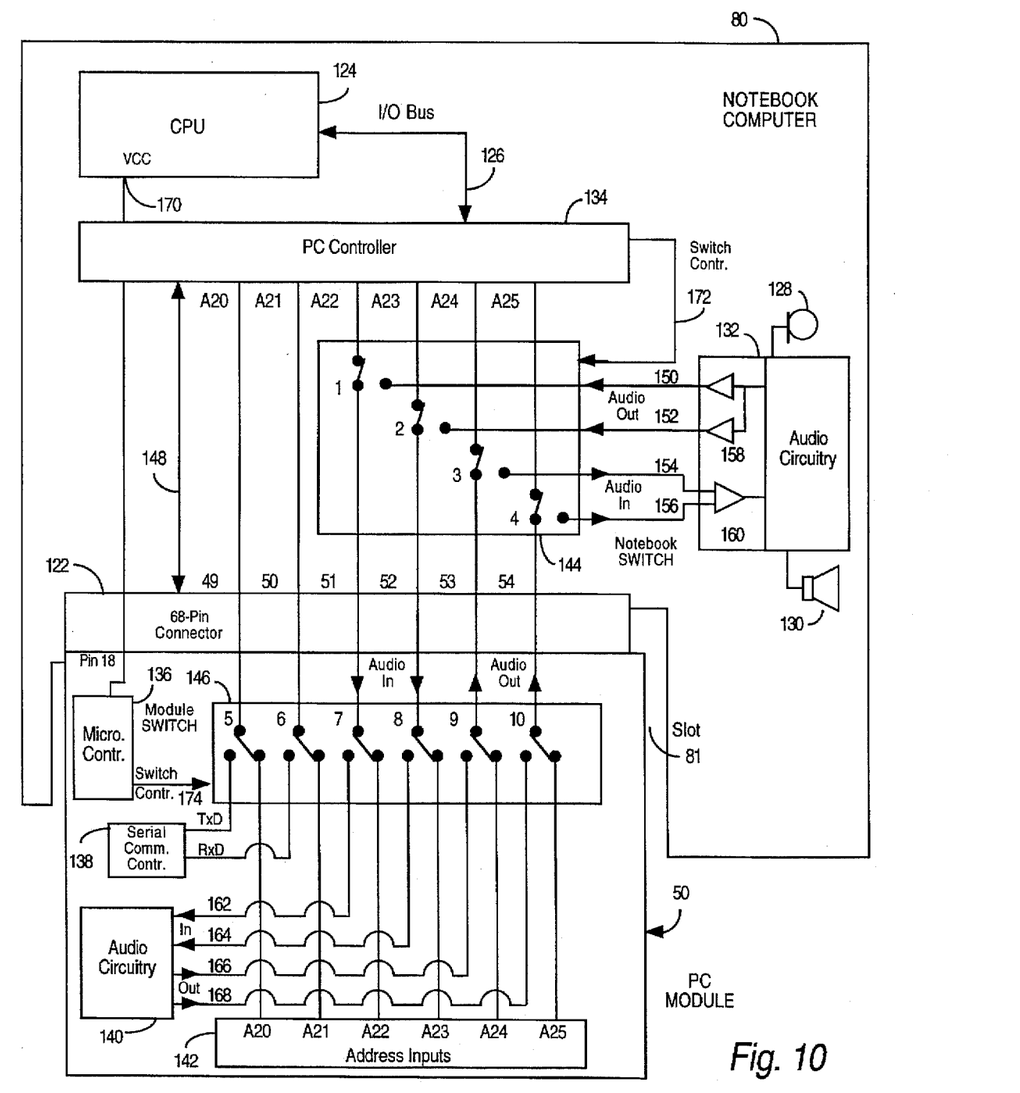
FIGS. 10 is a circuit diagram illustrating an audio interface in default mode between the notebook computer and the PC module.
Figure 11:
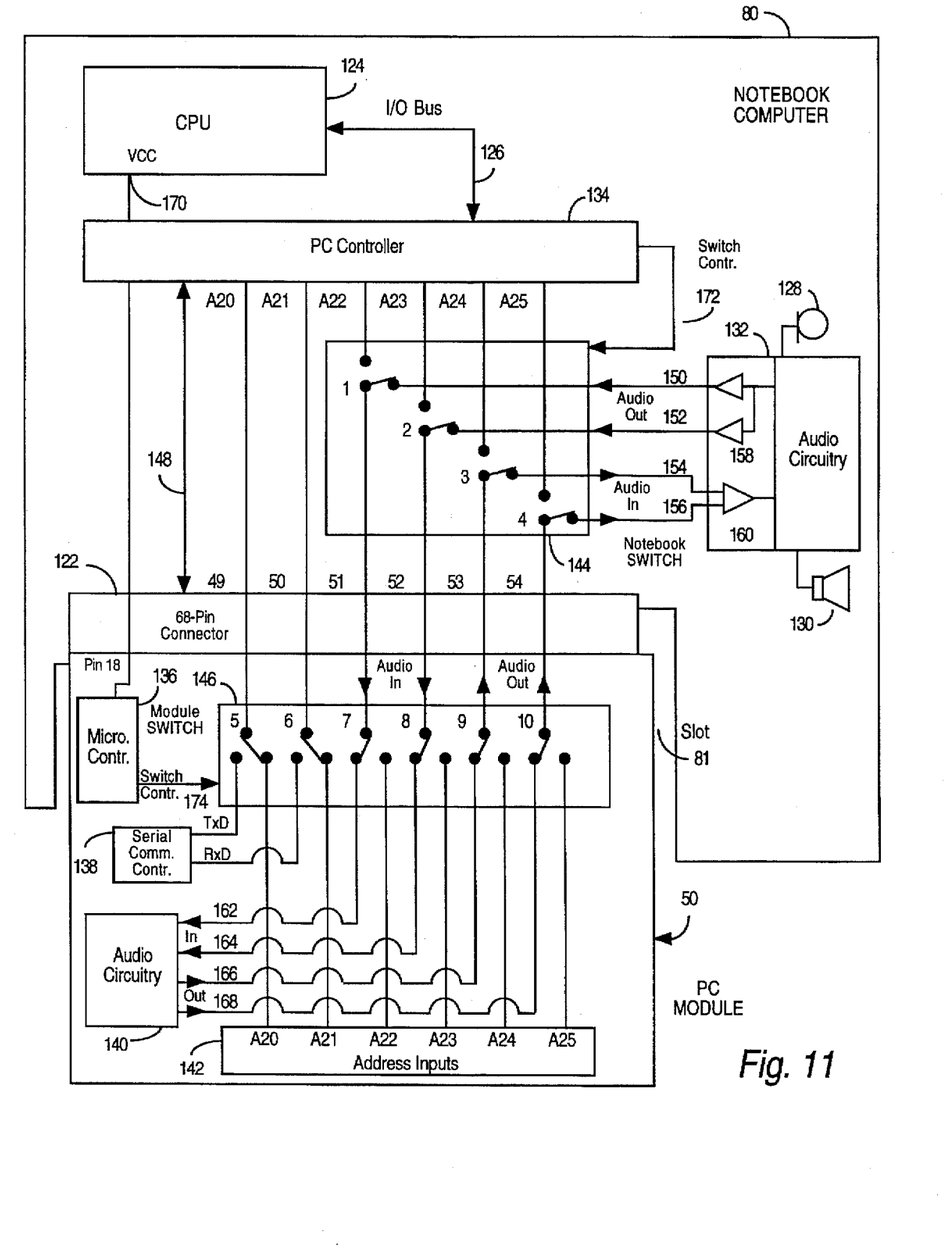
FIG. 11 is a circuit diagram illustrating the audio interface in audio mode between the notebook computer and the PC module.

FIGS. 10 and 11 illustrate the audio interface of the present invention when the PC module 50 is docked into the slot 81 of the notebook computer 80 using a standard 68-pin connector 122. FIG. 10 illustrates the audio interface between the notebook computer 80 and the PC module in default mode while FIG. 11 illustrates the audio interface between the notebook computer 80 and PC module 50 in audio mode. In the default mode, the PC interface operates as normal, but in the audio mode the PC interface is modified to provide a four-wire analog audio interface, as explained below.

The notebook computer 80 contains well known computer components, which will not be discussed here in detail, including a CPU (central processing unit) 124 for processing data, an I/O (input/output) bus 126 for communication with various computer components, a microphone 128, a speaker 130, audio circuitry 132 for applications requiring sound processing, and a PC controller 134 which acts as the interface between the 68-pin connector 122 and the I/O bus 126. The PC module 50 also contains well-known standard components including a microcontroller 136 for controlling and coordinating the electrical devices within a PC card, audio circuitry 140 which includes a standard audio signal processor as part of the circuitry of the cellular radio 52 of FIG. 5 in a standard fashion, and address inputs 142 which are used by the addressing circuitry (not shown) for performing normal PC card functions, such as accessing memory or registers in the PC module 50.

To modify the standard PC interface, the present invention adds to the notebook computer 80 a notebook switch 144, a pair of audio-out lines 150 and 152, and a pair audio-in lines 154 and 156. In addition, amplifiers 158 and 160 are included in the audio circuitry 132 for increasing signal strength of the audio lines 150 through 156. Similarly, the present invention adds to the PC module 50 a module switch 146, a pair of module audio-in lines 162 and 164, and a pair of module audio-out lines 166 and 168. A serial communications controller 138 is also added to the PC module 50 for controlling external digital serial communications through the customized PC interface when the PC module 50 is docked in the handset 60 (FIG. 5), as discussed below.

The switches 144 and 146, and the audio lines 150 through 156, and 162 through 168, function to modify the pin assignments of the pins designated as 49, 50, 51, 52, 53, and 54 on the PC 68-pin connector 122. As described here, the 68-pin connector 122 is the single unit formed when the 68-pin female connector 59 of the PC module 50 is mated with the 68-pin male connector of the PC slot 81. In an unmodified PC card, pins 49 through 54 extend from the 68-pin connector 122 to connect directly to lines A20 through A25 of the PC controller 134, and to lines A20 through A25 of the address inputs 142 of the PC card 50.

In accordance with the present invention, switches 1, 2, 3 and 4 of the notebook computer 80 reassign pins 51, 52, 53 and 54 of the standard PC interface to audio lines 150, 152, 154 and 156. The remaining signal assignments of the 68-pin connector 122 in the notebook computer 80 are connected directly to the PC controller 134 over a standard PC bus 148. Since the notebook switch 144 reassigns pins 51 through 54 using the four analog audio lines 150 through 162, the notebook switch 144 is referred to as providing a four-wire analog interface to the standard digital PC card interface.

In the PC module 50, switches 7, 8, 9 and 10 reassign pins 51, 52, 53 and 54 of the standard PC interface to audio lines 162, 164, 166 and 168. As shown in FIG. 10, pins designated 49 and 50 of the PC connector 122 are also input to the module switch 146. However, pins 49 and 50 are only reassigned by switches 5 and 6 when the PC module 50 is docked in the handset 60 as explained below. Therefore, when the PC module 50 is docked in the notebook computer 80, the PC module 50 also provides a four-wire analog interface to the standard digital PC card interface using the four audio lines 162 through 168.

Upon insertion of the PC module 50 into the slot 81 of the notebook computer 80, the notebook computer 80 is in default mode and the PC module 50 appears to the CPU 124 as a standard PC card. The CPU 124 activates a standard CPU VCC (power line) 170 which supplies power to the PC module 50 over pins 17 and 51 (not shown) and Pin 18. After the PC module 50 senses that power is applied to Pin 18, the PC module 50 resets to default mode. As shown in FIG. 10, in the default mode switches 1, 2, 3 and 4 of the notebook switch 144 are positioned (vertically) to connect pins 51, 52, 53 and 54 of the 68-pin connector 122 to lines A22, A23, A24 and A25 of the PC controller 134 according to PC card standards. Switches 5, 6, 7, 8, 9 and 10 of the module switch 146 are positioned (to the right) to connect pins 49, 50, 51, 52, 53 and 54 to lines A20, A21, A22, A23, A24 and A25 of the address inputs 142, also according to PC Card standards. At this point, the notebook audio lines 150, 152, 154 and 156, and the module audio lines 162, 164, 166 and 168 are isolated.

After the PC module 50 receives power, the CPU 124 and the PC module 50 then begin a standard PC configuration protocol. The CPU 124 determines whether or not the PC module 50 is compatible for audio operation by reading a PC standard card information structure (CIS) from the PC module 50. The CIS is a data structure included in PC cards that informs a CPU of the specific requirements of the particular PC card. The CIS included in the microcontroller 136 of the PC module 50 informs the CPU 124 that the PC module 50 is a cellular modem card requiring an audio interface. Through the CIS and ensuing dialogue, the CPU 124 and the microcontroller 136 of the PC module 50 agree to enter into audio mode by reconfiguring the PC interface.

Audio mode begins in the notebook computer 80 when the CPU 124 instructs the PC controller 134 to reconfigure the PC interface by repositioning the notebook switch 144. The PC controller 134 responds by activating a switch control line 172 which repositions the notebook switch 144. At the same time, audio mode begins in the PC module 50 when the microcontroller 136 reconfigures the PC interface by activating a switch control line 174 to reposition the notebook switch 144.

FIG. 11 is a circuit diagram of the notebook computer 80 and the PC module 50 in the audio mode. In the audio mode, switches 1 and 2 of the notebook switch 144 are positioned (to the right) to reassign pins 51, and 52 of the 68-pin connector 122 to the audio-out lines 150 and 152 of the audio circuitry 132. Similarly, switches 3 and 4 of the notebook switch 144 are positioned to reassign pins 53 and 54 of the 68-pin connector 122 to the audio-in lines 154 and 156 of the audio circuitry 132. In the PC module 50, switches 7 and 8 of the notebook switch 144 are positioned (to the left) to reassign pins 51, and 52 of the 68-pin connector 122 to the audio-in lines 162 and 164 to the audio circuitry 140. Switches 9 and 10 of the notebook switch 144 are positioned to reassign pins 53 and 54 of the 68-pin connector 122 to the audio-out lines 166 and 168 of the audio circuitry 132.

The audio interface of the present invention enables analog bidirectional communication between the PC module 50 and the audio circuitry 132 of the notebook computer 80. The voice capability provided by the audio interface may be used by a host computer to implement speakerphone and voice applications through the speaker 130 and microphone 128 as long as a host computer includes the switch 144 and the audio lines 150 through 156 of the analog interface as described herein. During a telephone conversation, audio signals received over the air by the cellular radio 52 (FIG. 4) of the PC module 50 are processed by the audio circuitry 140 of the PC module 50 and then transmitted over the audio-out lines 166 and 168 to the audio-in lines 154 and 156 of the notebook computer 80 through pins 53 and 54 of the 68-pin connector 122. The audio signals are then processed by the audio circuitry 132 and transmitted to the speaker 130 of the notebook computer 80. Signals received from the notebook 80 user over the microphone 128 are processed by the audio circuitry 132 of the notebook Computer 80 and transmitted over audio-out lines 150 and 152 to the audio-in lines 162 and 164 of the PC module 50 using pins 51 and 52 of the 68-pin connector 122. The signals are processed by the audio circuitry 140 and then broadcast to their destinations over the cellular radio 52.

Figure 12:
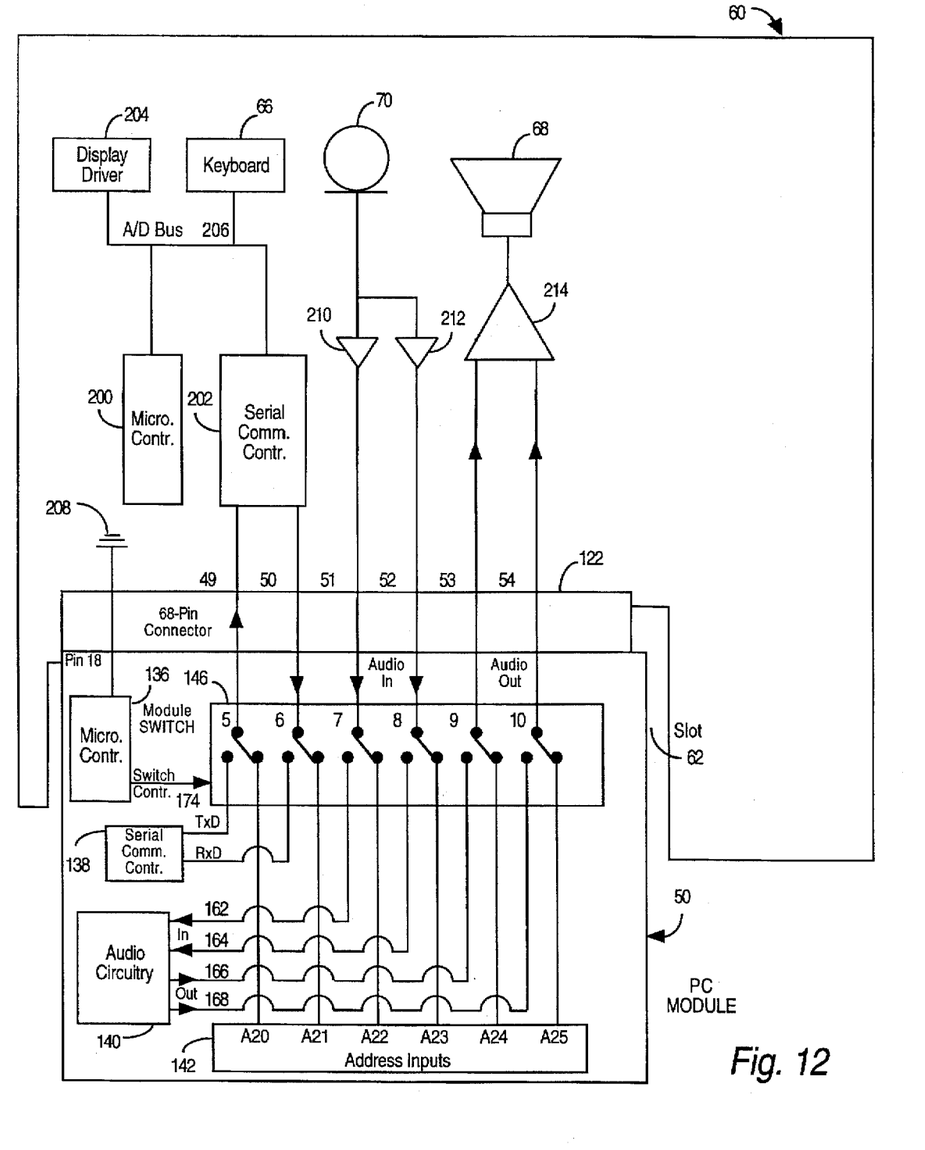
FIGS. 12 is a circuit diagram illustrating an audio interface in default mode between the PC module and the handset.
Figure 13:
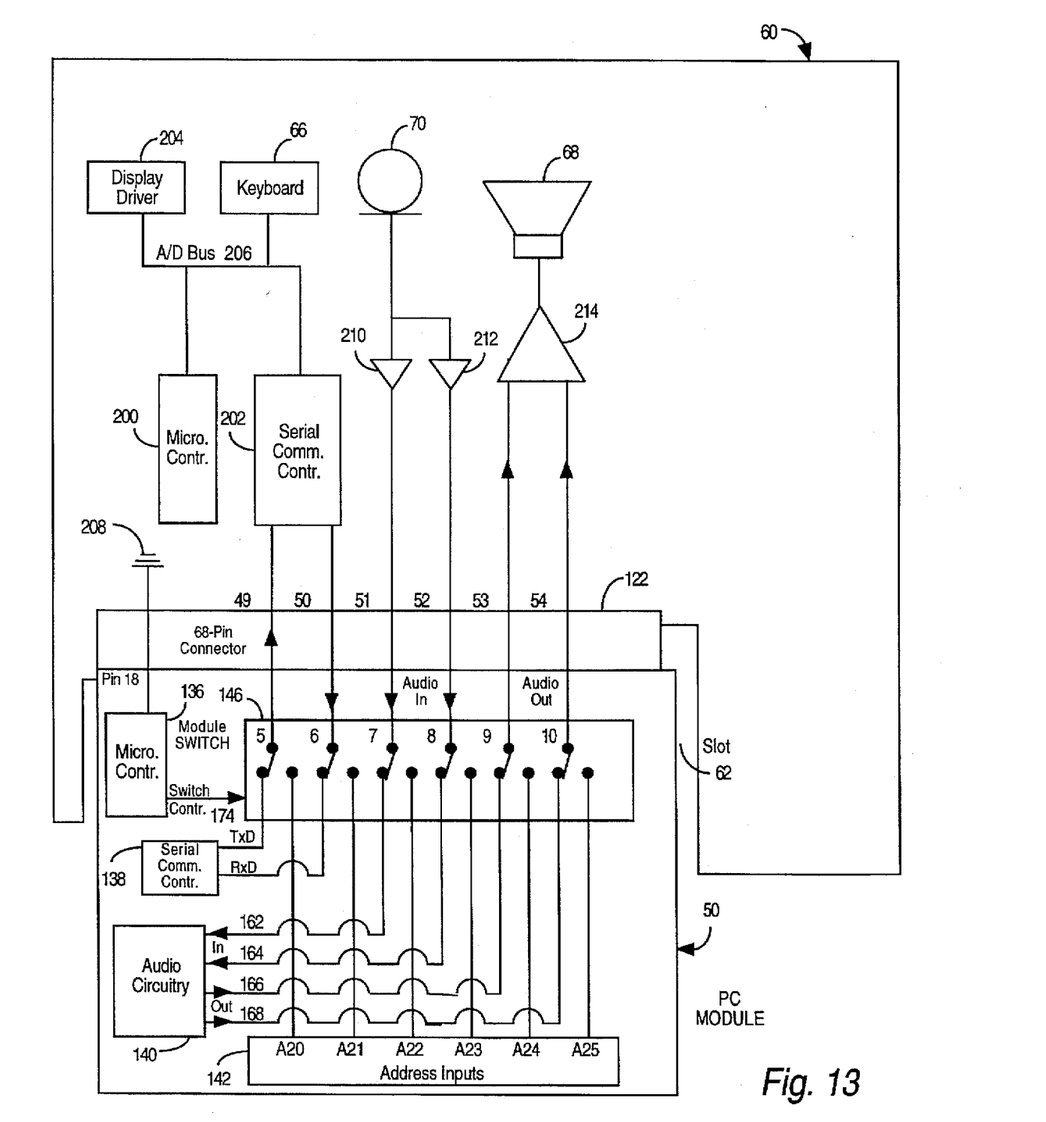
FIG. 13 is a circuit diagram illustrating the audio interface in audio mode between the PC module and the handset.

FIGS. 12 and 13 illustrate the analog interface of the PC module 50 when it is docked in the handset 60. FIG. 12 illustrates the analog interface of the PC module in the default mode while FIG. 13 illustrates the analog interface of the PC module 50 in normal audio mode. The handset 60 includes the display 64 (not shown), the keyboard 66, the microphone 70, and the speaker 68 of the handset (see FIG. 5). The handset also includes a display driver 204 to operate the display 64, a serial communication controller 202, and a microcontroller 200 for controlling the operation of the display driver 204 and the keyboard 66 through an address/data bus 206.

In the handset 60, pins 49 and 50 of the 68-pin interface are connected directly to the serial communications controller 202 while pins 51 and 52 are connected directly to the microphone 70 through amplifiers 210 and 212, and pins 53 and 54 are connected directly to the speaker 68 through amplifier 214. These direct connections eliminate the need for a switch as used in the notebook computer 80. Both the serial communications controller 202 in the handset 60 and the serial communications controller 138 in the PC module 50 control digital serial communications through the 68-pin connector 122. The use of the serial communications controllers 202 and 138 are required to enable the exchange of digital data and control signals between the handset microcontroller 200 and the microcontroller 136 in the PC module 50. The use of the serial communications controller 138 is not required when the PC module 50 is docked in the notebook computer 80 (see FIG. 10) because the CPU 124 communicates with PC module 50 using the digital PC bus 148 of FIG. 10. The microcontroller 136 of the PC module 50 communicates with the serial communications controller 138, the audio circuitry 140, and the address inputs 142 through a standard a PC module bus (not shown).

Upon insertion of the PC module 50 into the slot 62 of the handset 60, the PC module 50 is in default mode. As shown in FIG. 12, switches 5 through 10 of the module switch 146 are positioned (to the right) to assign pins 49 through 54 to address lines A20 through A25 of the address inputs 142 according to PC card standards, as explained above. The handset 60 provides power to the PC module 50 through pins 17 and 51 (not shown) and applies a ground 208 to Pin 18 of the 68-pin connector 122. Through the ground 208 applied to Pin 18, the microcontroller 136 determines that the PC module 50 is inserted into the handset 60 and that audio mode is required.

After detecting the ground 208 on Pin 18, the PC module microcontroller 136 begins the audio mode by activating the switch control line 174 to reposition switches 5 through 10 of the notebook switch 136. As shown in FIG. 13, switches 7 and 8 of the notebook switch 144 are positioned (to the left) to reassign pins 51, and 52 of the 68-pin connector 122 to the audio-in lines 162 and 164 to the audio circuitry 140. Switches 9 and 10 of the notebook switch 144 are positioned to reassign pins 53 and 54 of the 68-pin connector 122 to the audio-out lines 166 and 168 of the audio circuitry 132 (just as when the PC module 50 is docked in the notebook computer 80). In addition, switch 5 of the notebook switch 144 reassign pins 49 to a standard transmit data (T×D) line, and switch 6 of the notebook switch 144 reassigns pin 50 to a standard receive data (R×D) line of the analog interface. Reassigning pins 49 and 50 of the 68-pin connector 122 to the T×D and R×D lines enable the serial communication controller 138 of the PC module 50 to transmit and receive control and data signals with the serial communications controller 202 of the notebook computer 80.

After the switch 146 is repositioned, as shown in FIG. 13, analog signals received over the cellular radio 52 (see FIG. 4) are transmitted to the speaker 68 of the handset 60 through lines 166 and 168, and analog signals received by the microphone 70 of the handset 60 are transmitted to the cellular radio 52 of the module 50 through lines 162 and 164. This enables analog voice conversations through handset 60 using the PC module 50.

In summary, a cellular-based communication system has been disclosed comprising a handheld telephone handset containing a PC slot, and a PC card containing wireless telephone electronics that provides cellular usage to both a notebook computer and the handset using a single subscription and telephone number. The present invention has been described in terms of a preferred embodiment wherein the PC module 50 is a PCMCIA card. In addition to the standards above, a PC module could be provided that is compatible with the Cellular Digital Packet Data (CDPD) standard or the European Group Special Mobile (GSM) cellular standard, and the analog modem could be upgraded to a CCITT V.34 (Vfast) standard modem. Applications similar to wireless cellular technology could also be developed on a PC Type III card in order to accommodate emerging markets such as digital cordless phones for office and short range public applications, for example.

The invention, however, is not limited to the embodiment depicted and described. Rather, the scope of the invention is defined by the appended claims.

What is claimed is:

1. An analog interface between a PC card and an electronic device, said PC card and said electronic device communicating through a PC card digital interface including a plurality of pin contact points between said PC card and said electronic device, said analog interface comprising:

a first audio circuit in said PC card;

a first audio-in line and a first audio-out line connected to said first audio circuit in said PC card;

first detecting means for detecting that said PC card is inserted into said electronic device;

first switching means responsive to said first detecting means for switching said plurality of pin contact points of said PC cad digital interface to said first audio-in and audio-out lines in said PC card, thereby enabling analog communication between said electronic device and said PC card through said PC digital interface;

a second audio-circuit in said electronic device;

a second audio-in line and a second audio-out line connected to said second audio circuit in said electronic device;

second detecting means for detecting that said PC card is inserted into said electronic device;

second switching means responsive to said second detecting means for switching said plurality of pin contact points of said PC digital interface to said second audio-in and audio-out lines in said electronic device;

a serial communication controller for controlling digital communications through said analog interface; and a transmit data line and a receive data line for interfacing with said serial communication controller, wherein said first switching means switches a first one of said plurality of pin contact points to said transmit data line and switches a second one of said plurality of pin contact points to said receive data line.

2. An analog interface as recited in claim 1 wherein said plurality of pin contact points between said PC card and said electronic device include pins designated 49, 50, 51, 52, 53, and 54 according to PCMCIA standard 2.1.

3. An analog interface as recited in claim 1 wherein:
   said electronic device is a computer; and
   said PC card comprising an analog modem.

* * * * *